US005437524A

United States Patent [19]

Huang

[11] Patent Number: 5,437,524

[45] Date of Patent: Aug. 1, 1995

[54] TORQUE-ADJUSTMENT CONTROLLER

[76] Inventor: Jin-Tarn Huang, No. 39, Lane 240, Lijen Road, Tarli City, Taichung Hsien, Taiwan

[21] Appl. No.: 253,078

[22] Filed: Jun. 2, 1994

[51] Int. Cl.[6] .................. B23B 31/38; B25B 23/157

[52] U.S. Cl. .................. 408/139; 81/474; 192/56 R; 279/145; 279/157

[58] Field of Search .................. 408/139, 140; 470/103; 192/56 R, 56 C; 81/467, 473–475; 279/143, 145, 157

[56] References Cited

U.S. PATENT DOCUMENTS

| | | | |
|---|---|---|---|
| 3,020,789 | 2/1962 | Etzkorn | 81/474 |
| 3,599,765 | 8/1971 | Turner, III et al. | 279/145 |
| 4,262,501 | 4/1981 | Vaughn et al. | 81/474 |
| 4,514,115 | 4/1985 | Akashi | 408/139 |

*Primary Examiner*—Steven C. Bishop
*Attorney, Agent, or Firm*—Bacon & Thomas

[57] ABSTRACT

Disclosed is a torque-adjustment controller for use with a tool to safely adjust and control the torque the tool works on a workpiece. The torque-adjustment controller mainly consists of a housing, an output shaft, an input shaft, a stepped ring, a lugged movable member contacting the stepped ring, a torque spring disposed between the output and the input shafts. The output shaft has recesses to engage with steel balls contained on the input shaft so that force exerted on the input shaft by a tool may be transmitted to the output shaft via the engagement of the steel balls with the recesses of the output shaft. The stepped ring has multiple sets of steps providing different head drops and will cause the lugged movable member contacting it to shift axially when the stepped ring is rotated. The axially shifted movable member will further compress the torque spring to generate stronger torque or release the torque spring for the same to generate weaker torque. Such adjusted torque is transmitted from the input shaft to the output shaft to work on a workpiece to safely protect the latter from being damaged due to improper torque of tool.

1 Claim, 3 Drawing Sheets

TORQUE-ADJUSTMENT CONTROLLER

BACKGROUND OF THE INVENTION

The present invention relates to a torque-adjustment controller for use with a tool as a driving means, and more particularly to a torque-adjustment controller in which a stepped ring providing different head drops is used to change the degree of compression of a torque spring in the driving means so that the latter can be set to a predetermined proper torque to protect the workpiece under fabricating or assembling.

When an item, especially a precision equipment or machine, is assembled, different torques are required to work on workpieces or parts with different materials, such as plastic/plastic or plastic/metal, so as to protect the parts or workpieces from undesirable breaking due to improper torque of tool. With commonly used pneumatic or electric tools, it is usually difficult to have the output of the tool under good control, and will therefore, damage the parts or cause imcomplete assembly. When a drill press is used in drilling or tapping and an area of the workpiece with higher hardness is encountered, the tapper or drill bit might get broken. Therefore, it is desirable to have a way to keep proper driving torque of the tool to provide an optimal driving function.

For example, when a plastic plate is to be connected to a steel plate, the torque used to combine them is, of course, different from that required to combine two plastic plates or two steel plates. And, when using a driver to fasten something, the force applied through the driver by a man and by a woman shall be different in strength. In general assembly, it is really difficult for the operator to perceive what is the most suitable force to apply to the workpiece. When the force is too strong, it might cause the plastic plate to break; or reversely, when the force is too small, it might cause a loose assembly. To achieve good assembly, it is necessary for the fastening tool to provide proper torque to prevent the workpiece from breaking or future loosening.

SUMMARY OF THE INVENTION

A primary object of the present invention is to provide a torque-adjustment controller for use with a tool, in which a torque spring is used as a means to transmit the torque, and a stepped ring and a movable member are used to change the extent of compression of the torque spring so as to adjust and control the torque provided by the tool.

Another object of the present invention is to provide a torque-adjustment controller for use with a tool, in which a stepped ring with multiple sets of head drops is adopted for easy setting of different adjustment amounts according to scales indicated on the controller, so that the torque spring therein may transmit different torques.

A further object of the present invention is to provide a torque-adjustment controller for use with a pneumatic tool, an electric tool, and/or a drill press by attaching to an output shaft end of the tool whenever any area of the workpiece requires adjusted torque of tool.

DETAILED DESCRIPTION OF THE PREFERRED EMBODIMENT

Figure 1:
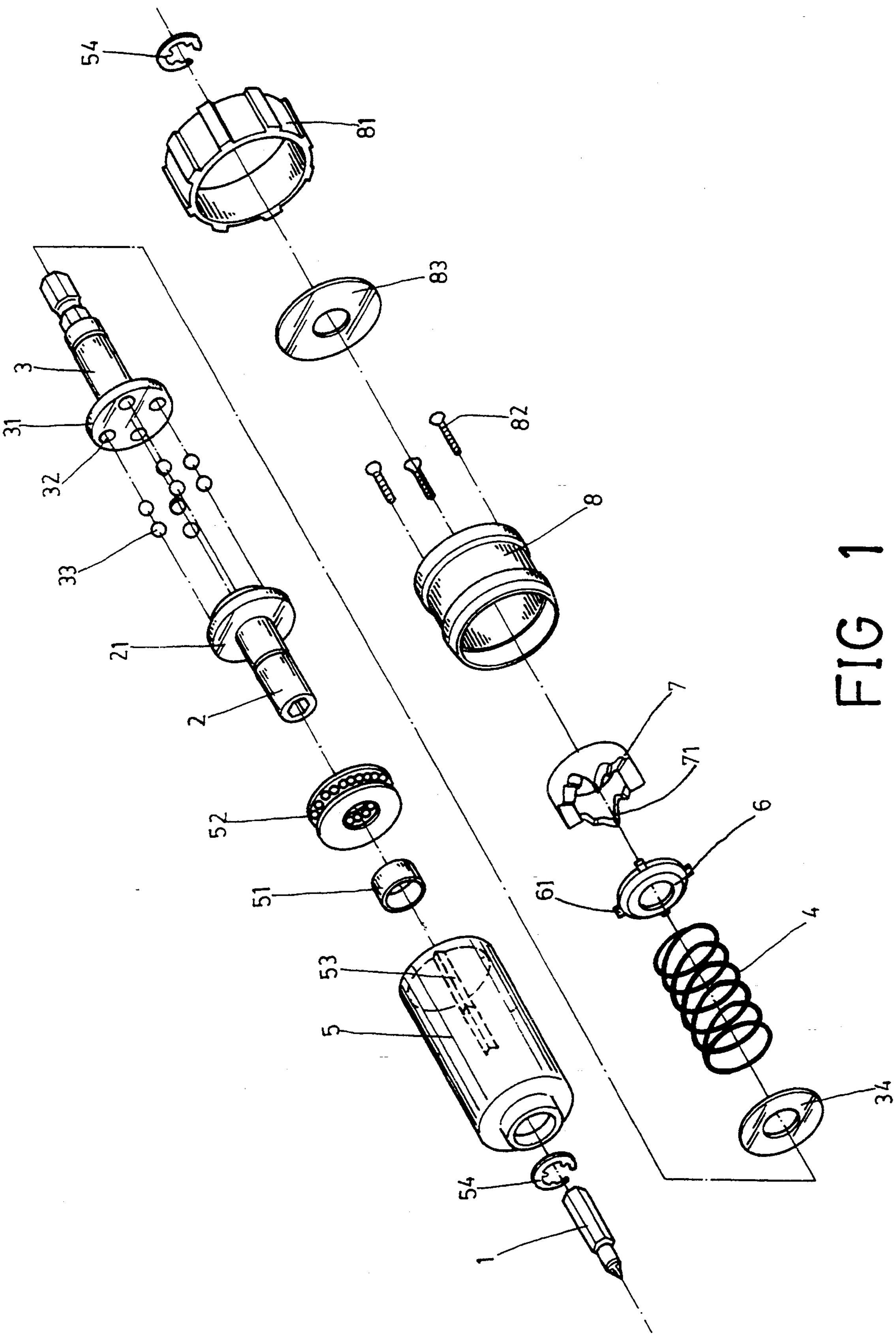
FIG. 1 is an exploded perspective of an embodiment of the present invention.

Please refer to FIG. 1 in which an embodiment of the torque-adjustment controller according to the present invention is shown. The controller mainly consisting of a normal hexagonal screw-driver bit 1, an output shaft 2 having a central hole into which the screw-driver bit 1 is inserted, an input shaft 3 corresponding to the output shaft 2 to contain a plurality of steel balls 33 between the output and the input shafts 2, 3, a torque spring 4 axially disposed on the input shaft 3, a hollow cylindrical housing 5 for accommodating the output shaft 2, the input shaft 3, the torque spring 3, a thrust bearing 52, a movable member 6 and a stepped ring 7 therein, and an annular compression adjusting ring 8.

Figure 2:
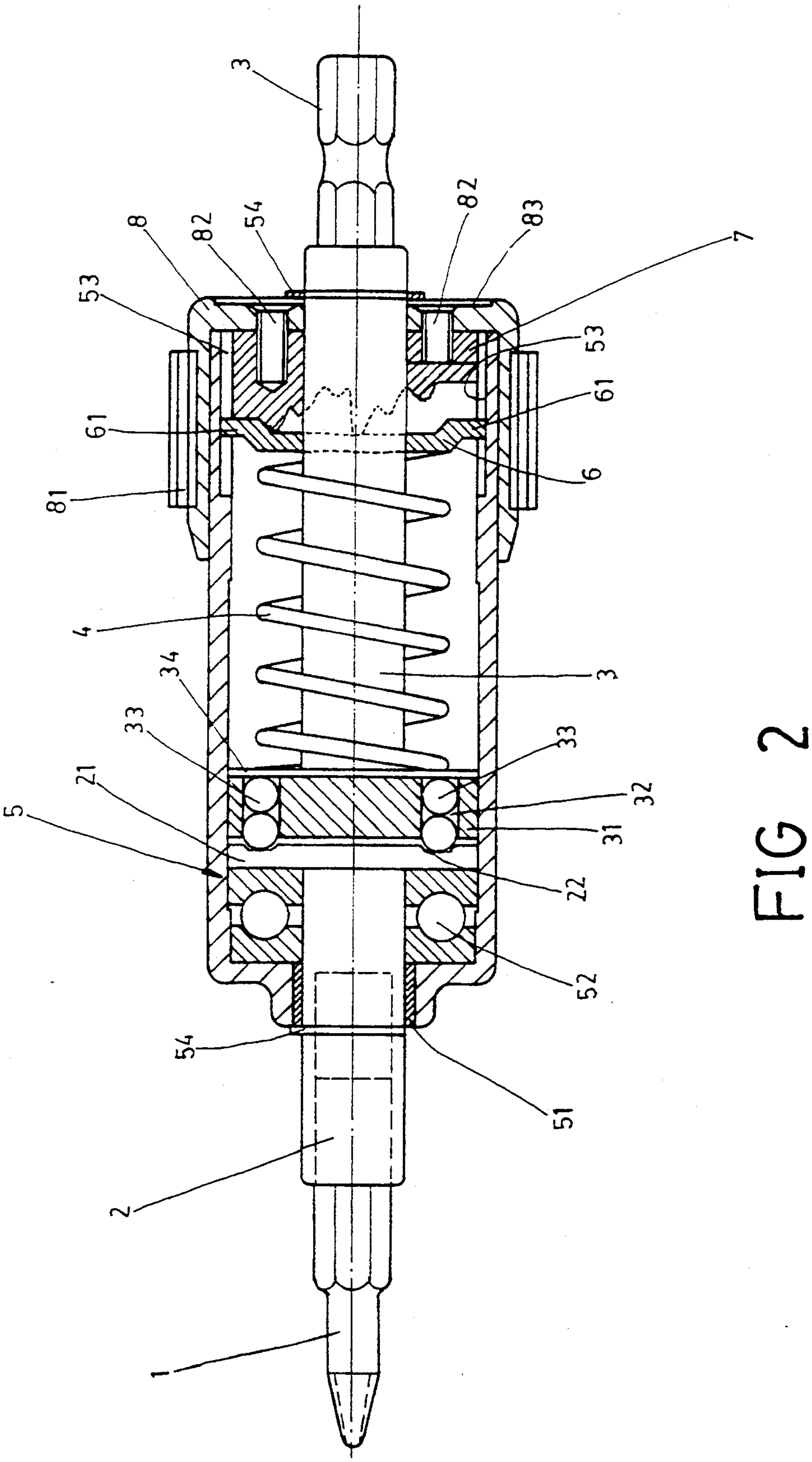
FIG. 2 is an assembled sectional side view of the present invention according to FIG. 1.

Please refer to FIGS. 1 and 2 at the same time. The output shaft 2 includes a disc portion 21 provided at one rear end thereof. A plurality of shallow recesses 22 with predetermined depth are formed on a rear surface of the disc portion 21 (there are four recesses 22 in this embodiment). The input shaft 3 also has a disc portion 31 provided at a front end thereof corresponding to the disc portion 21. Through holes 32 are formed on the disc portion 31 to just correspond to the recesses 22 of the disc portion 21. The disc portion 31 has adequate thickness such that each of the through holes 32 may contain several steel balls 33 therein (in this case, two steel balls 33 are contained in each through hole 32). A washer 34 is disposed on the input shaft 3 to cover the through holes 32 from a rear surface of the disc portion 31 and for the torque spring 4 to press against it. The depth of the disc portion 31 allows the steel balls 33 to just project an adequate part of its spherical surface from the through holes 32, so that the partially projected steel balls 33 may fitly engage into a corresponding recess 22 on the disc portion 21. Through the engagement of the steel balls 33 with the recesses 22, the input shaft 3 may be rotated and drive the output shaft 2 to rotate at the same time. In the event the output shaft 2 encounters resistance and thereby generates increased antitorque which is even higher than the torque generated by the torque spring 4, the engagement of the steel balls 33 with the recesses 22 will be destroyed. At this point, the steel balls 33 shall disengage from the recesses 22, and the input shaft 3 fails to drive the output shaft 2 to rotate. In other words, the compression force of the torque spring 4 is a critical factor in the effective engagement of the input and the output shafts 3, 2. The torque-adjustment controller of the present invention is designed to adjust and control the compressed extent of the torque spring 4. What to be understood is that the engagement of the first disc portion 21 with the second disc portion 31 may also be achieved via the recesses 22 and the same numbers of teeth formed on the second disc portion 31 to replace the through holes 32 and the steel balls 33. However, the steel balls 33 is preferred in the present invention.

An annular bushing 51 is disposed in a front outlet of the housing 5. A plurality of grooves 53 are formed on an inner wall of the housing 5 near a rear outlet thereof, as shown by broken lines in FIG. 1.

The movable member 6 is a substantially circular flat member and has a plurality of radially extended lugs 61

(there are four lugs 61 in this embodiment), the numbers of which are the same as those of the grooves 53 of the housing 5, such that when the movable member 6 is disposed on the input shaft 3 behind the torque spring 4 for the same to bear against it, the lugs 61 are separately received in the grooves 53 to guide the movable member 6 to move inside the housing 5.

The stepped ring 7 has a front stepped side and a rear plane side. The stepped side is provided with several sets of steps 71 which provide stepped head drops. As clearer shown in FIG. 2, the structure of the movable member 6 further enables the lugs 61 to engage with the steps 71 of the stepped ring 7 so that the movable member 6 are shifted to move forward or backward following the high or low profile of the steps 71, respectively. For stable and even forward and backward shift of the movable member 6, the numbers of set of steps 71 are preferably the same as those of the lugs 61.

The compression-adjusting ring 8 is substantially a hollow cylindrical member mounting over a rear end of the housing 5. By means of fixing screws 82, the compression-adjusting ring 8 is securely joined with the stepped ring 7 at the plane side thereof, such that the ring 8 and the ring 7 can rotate simultaneously. A decorative plate, such as an aluminium plate 83, can be used to cover the rear end of the housing 5 and be fixed thereto by means of a C-ring 54.

With these arrangements, when the compression-adjusting ring 8 is rotated, the stepped ring 7 is turned, too. The turning of the stepped ring 7 causes the steps 71 to force the movable member 6 to move forward or backward following the high or low profile of the steps 71. Since the lugs 61 are securely received in the grooves 53, the movable member 6 is prevented from turning inside the housing 5 but shifts along the longitudinal axis of the input shaft 3, and thereby presses the torque spring 4 to produce changed extent of compression, that is, changed torque.

When the input shaft 3 is rotated by a pneumatic or electric tool, the steel balls 33 in the through holes 32 of the disc portion 31 of the input shaft 3 shall, under the torque transmitted by the torque spring 4, drive the output shaft 2 to rotate through their engagement with the recesses 21 of the disc portion 21 of the output shaft 2. The smaller the extent of compression of the torque spring 4 is (i.e., the smaller the change in length of the spring 4 is), the weaker the torque generated by the torque spring 4 is. Reversely, the larger the extent of compression of the torque spring 4 is, the stronger the torque generated by the torque spring 4 is.

A turning member 81 is circumsferentially and fixedly disposed over the compression-adjusting ring 8 for rotating the latter. When the compression-adjusting ring 8 is rotated through the turning member 81, the stepped ring 7 screwed to the ring 8 is driven to rotate, causing the lugs 61 of the movable member 6 to contact the high and low profiles of the steps 71. The different head drops provided by the steps 71 force the movable member 6 to shift in a longitudinal direction within a range relative to the head drops of the steps 71. The axial shift in the position of the movable member 6 shall exert different compression force on the torque spring 4. If a smaller torque is desired, turn the stepped ring 7 so that the movable member 6 moves backward to reduce the force it exerts on the torque spring 4, that is, the torque spring 4 shall generate smaller torque. Reversely, when a larger torque is required, turn the stepped ring 7 so that the movable member 6 moves forward to increase the force it exerts on the torque spring 4, that is, the torque spring 4 shall generate larger torque.

To protect the internal components from falling out of the housing 5 due to improper pressure working on the components by the torque spring 4, and to ensure a good assembly of the present invention, the compression-adjusting ring 8 may be designed to join with the housing 5 by screwing it to the rear end of the housing 5. Additional retaining points may be further provided to prevent the ring 8 and the housing 5 from disengaging from each other easily. C-rings 54 may be used at the front and the rear outlets of the housing 5 to securely retain the output shaft 2 and the input shaft 3 to the housing 5. Since this a prior art and can be changed to any other suitable manner, it is not described in details herein.

Figure 3:
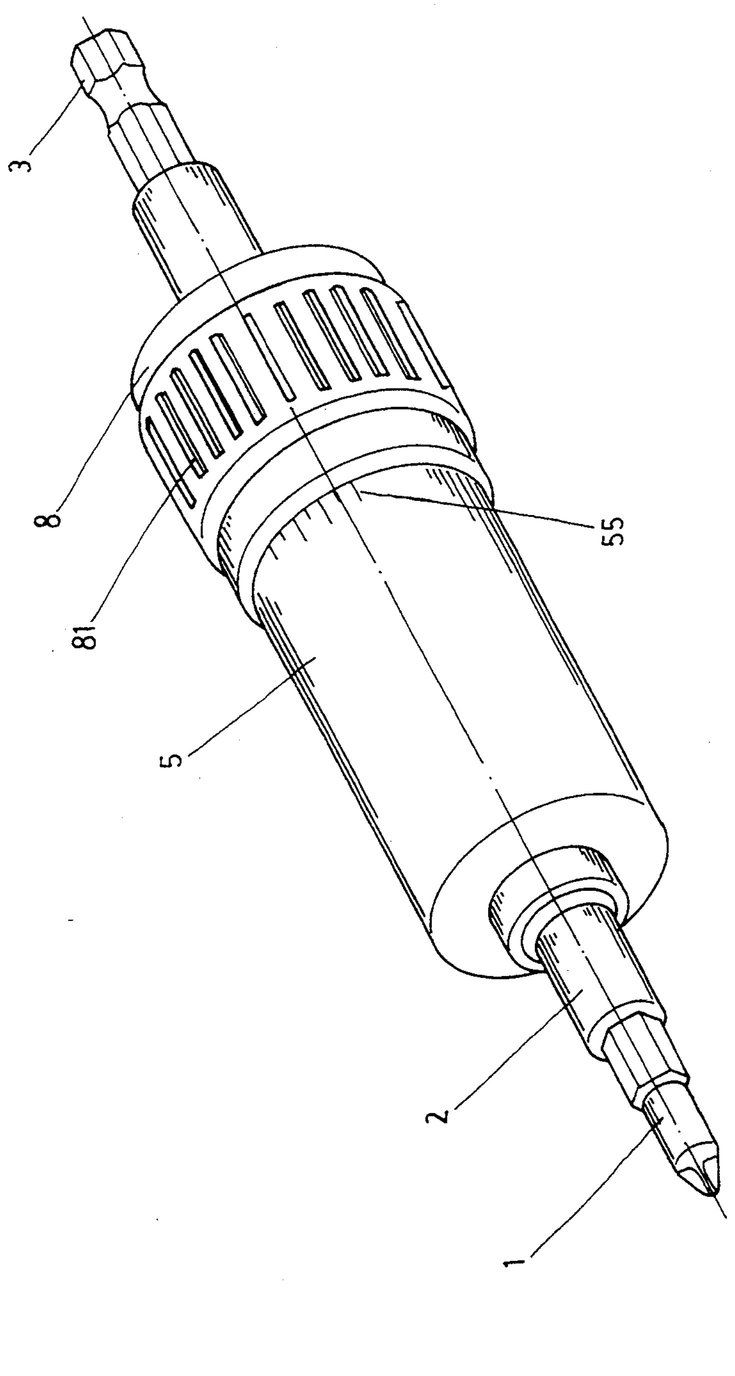
FIG. 3 is a perspective view of the present invention according to FIG. 1.

Please refer to FIG. 3. To facilitate the setting of required pounds of torque, scales 55 may be provided on the housing 5 at suitable positions, indicating the torque to be generated by the torque spring 4 through the rotation of the turning member 81 over the compression-adjusting ring 8.

To use the present invention, just connect it to a screw driver, a pneumatic tool, an electric tool, or a drill press. Since the force produced by the rotated tool is transmitted to the workpiece through the input shaft 3, the spring 4, and the output shaft 2 driven by the input shaft 3 through steel balls 33, rotate the compression-adjusting ring 8 to set the torque as necessary shall provide an adequate torque transmission through the action of the stepped ring 7 on the movable member 6 and thereby the torque spring 4, preventing the workpiece from being damaged during the fastening, drilling or fabricating due to an overly large torque generated by the tool. When the set torque is smaller the resistance encountered by the tool bit, the input shaft 3 will disengage from the output shaft 2 to turn idly, and the output shaft 2 shall therefore stop turning and ensure a safe screwing in the connection operation.

In brief, with the present invention, the driving force of a tool can be set as necessary prior to the assembling operation. When the set torque is smaller than the resistance encountered by the tool bit, the present invention shall automatically trip without damaging the workpiece. That means, the present invention is a safe torque-adjustment controller.

What is claimed is:

1. A torque-adjustment controller for use with a drilling, fastening tool, etc. to provide adjusted torque of the tool, comprising a housing, an output shaft having a first disc portion and being disposed at a front outlet of said housing, an input shaft having a second disc portion and being disposed inside said housing behind said output shaft, a stepped ring disposed at a rear outlet of said housing, a movable member having radially extended lugs and being disposed in front of and contacting said stepped ring, a torque spring disposed over said input shaft with one end pressing against said second disc portion and another end thereof pressing against said movable member, and a compression-adjusting ring covering said rear outlet of said housing;

said housing having a plurality of grooves axially formed on a part of an inner wall near said rear outlet thereof to each receive one of said lugs of said movable member therein; said grooves and said lugs being of the same number;

said first disc portion of said output shaft being formed at a rear surface with a plurality of recesses which corresponds to the same number of through holes formed on said second disc portion of said input shaft, allowing a plurality of steel balls disposed in said through holes to engage into said recesses in a rolling manner, such that force can be transmitted from said input shaft to said output shaft via the engagement of said steel balls with said recesses; said steel balls disengaging from said recesses in the instant said torque produced by said torque spring and transmitted to said input shaft via said steel balls encounters an even higher resistance from a workpiece under fabrication, safely protecting said workpiece from damaged by an overly large torque of said tool; and said compression-adjusting ring and said stepped ring being joined together by means of screws, such that when said compression-adjusting ring is rotated, said stepped ring is turned simultaneously; said stepped ring being formed with multiple sets of high- and low-profile steps which provide different head drops, such that when said lugs of said movable member contacting said steps of said stepped ring are displaced by said rotating stepped ring within the range relative to the head drops provided by said steps, said movable member is shifted forward or backward along said grooves on said housing, and thereby compress or releases said torque spring disposed between said movable member and said second disc of said input shaft, allowing said compressed or released torque spring to produce a stronger or a weaker torque, respectively, working on said second disc and accordingly said steel balls, through which said torque produced by said torque spring is transmitted to said output shaft to complete a drilling, fastening or other operation via a tool bit connected to said output shaft.

* * * * *